(12) United States Patent
Shalev et al.

(10) Patent No.: US 11,434,067 B2
(45) Date of Patent: Sep. 6, 2022

(54) METHOD AND SYSTEM FOR PREPARING HOT DRINK USING COMBINED ROASTING AND BREWING

(71) Applicant: SO SPARK LTD., Herzeliya (IL)

(72) Inventors: Pinchas Shalev, Herzeliya (IL); Daniel Keidar, Tel Aviv (IL); Naor Baruch, Kfar Yona (IL); Arni Ron, Jerusalem (IL)

(73) Assignee: SO SPARK LTD., Herzeliya (IL)

( * ) Notice: Subject to any disclaimer, the term of this patent is extended or adjusted under 35 U.S.C. 154(b) by 492 days.

(21) Appl. No.: 16/477,240

(22) PCT Filed: Jan. 19, 2017

(86) PCT No.: PCT/IL2017/050076
§ 371 (c)(1),
(2) Date: Jul. 11, 2019

(87) PCT Pub. No.: WO2018/134808
PCT Pub. Date: Jul. 26, 2018

(65) Prior Publication Data
US 2019/0365141 A1 Dec. 5, 2019

(51) Int. Cl.
*A47J 31/42* (2006.01)
*A47J 31/52* (2006.01)
(Continued)

(52) U.S. Cl.
CPC .......... *B65D 85/8055* (2020.05); *A23F 3/18* (2013.01); *A23F 5/04* (2013.01); *A23F 5/262* (2013.01);
(Continued)

(58) Field of Classification Search
CPC .... A23F 3/18; A23F 5/04; A23F 5/262; A47J 31/42; A47J 31/52; A47J 31/3623; B65D 85/8055
See application file for complete search history.

(56) References Cited

U.S. PATENT DOCUMENTS 399,803 A    3/1889  Wagner
1,345,477 A * 7/1920  Cappelli ................. A47J 31/40
                                                    99/286

(Continued)

FOREIGN PATENT DOCUMENTS

EP        0041082 A1    12/1981
GB        2531687 A      4/2016
WO    WO 2008107645 A2   9/2008

OTHER PUBLICATIONS

European Extended Search report of European Patent Application No. 17892507.9 dated Sep. 15, 2020.
(Continued)

*Primary Examiner* — Anthony J Weier
(74) *Attorney, Agent, or Firm* — Pearl Cohen Zedek Latzer Baratz LLP

(57) ABSTRACT

A device and method for preparing hot beverage while combining roasting the brewing in the same device. When non-roasted or semi roasted grinds or scrunched leaves are used, completion of the roasting is performed by the device to a desired level of roasting. Thereafter brewing is performed in a desired temperature and a controlled pressure. The grinds or scrunched leaves can be provided packed in a capsule.

12 Claims, 8 Drawing Sheets

(51) Int. Cl.
　　　*A47J 31/36*　　　(2006.01)
　　　*A23F 5/04*　　　(2006.01)
　　　*A23F 5/26*　　　(2006.01)
　　　*A23F 3/18*　　　(2006.01)
　　　*B65D 85/804*　　(2006.01)

(52) U.S. Cl.
　　　CPC .......... *A47J 31/3623* (2013.01); *A47J 31/42* (2013.01); *A47J 31/52* (2013.01)

(56) References Cited

U.S. PATENT DOCUMENTS

| | | |
|---|---|---|
| 2,168,797 A | 8/1939 | Hodge |
| 2,325,684 A | 8/1943 | Kayden |
| 4,226,175 A | 10/1980 | Sandor |
| 5,387,256 A * | 2/1995 | Enomoto ............... A47J 31/42 34/233 |
| 5,939,121 A | 8/1999 | Gutwein et al. |
| 2003/0118707 A1 | 7/2003 | Kalenian |
| 2004/0134357 A1 | 7/2004 | Cai |
| 2007/0221067 A1 * | 9/2007 | Scelza ................... A47J 31/005 99/279 |
| 2013/0180406 A1 | 7/2013 | Hay et al. |

OTHER PUBLICATIONS

International Search Report of PCT Patent Application No. PCT/IL2017/050076, dated May 18, 2017.

\* cited by examiner

METHOD AND SYSTEM FOR PREPARING HOT DRINK USING COMBINED ROASTING AND BREWING

CROSS-REFERENCE TO RELATED APPLICATIONS

This application is a National Phase Application of PCT international Application No. PCT/IL2017/050076, International Filing Date Jan. 19, 2017, which is hereby incorporated by reference.

BACKGROUND OF THE INVENTION

Capsule based hot drink systems are well known and highly spread in consumer homes. In these systems, when coffee is the prepared hot beverage, the capsulated coffee provided is taken from pre-roasted coffee beans that are grinded to a required level, and then packed into disposable or multi-use capsules. The capsule is inserted into a system that runs hot pressurized water through the capsule, thereby brewing the coffee into the end user's cup.

In these systems the outcome of the hot beverage flavor, e.g. coffee flavor, is set by the capsule and cannot be adjusted by the user, as the capsules' content is pre-fixed in terms of coffee type/source, roasting degree and the coffee grinds particle size. Furthermore, the coffee content tends to age inside the capsule (roasted coffee is highly sensitive to aging, effecting directly the coffee flavor) and is not as fresh as possible. It is known that freshly roasted coffee holds more flavors then aged roasted coffee.

For the sake of clarity and ease of description the examples, analysis and description herein after will refer to HBBM of coffee grinds yet, it will be apparent to those skilled in the art that other types of base beverage materials may serve instead of coffee grinds for preparation of hot beverage.

It is known in the art that by changing the coffee parameters (even when capsulated) such as roast level and/or coffee beans grind level, one will experience a different flavor. As the coffee will be roasted to a higher level, the flavors will be bitterer for the matter, and if the coffee will be roasted to lower levels, the flavors will be more acidic and "fresh". If the coffee will be grinded too fine the flavor will be over extracted (thus tasting "burnt") and if the grind level will be course the coffee will taste diluted and under-extracted.

Furthermore, until today the coffee roasting process had been done with coffee beans, and not with coffee been grinds. It has been impossible to achieve a uniform roasting level with coffee been grinds in common roasting procedures. This is mainly due to the fact that the heat transfer inside the grind is too fast and uneven, and in large scale roasting it is almost impossible to achieve a uniform roast for a large batch of grinds. On top of that there was no need to roast grinds (green or even semi-roasted) as there was no available system that could complete the roasting procedure in a location far from the initial roasting plant in order to brew the freshest coffee possible, thus making this effort irrelevant.

SUMMARY OF THE INVENTION

A device for preparation of hot beverages is disclosed, the device comprising a hot water assembly, adapted to provide water in a determined pressure and temperature; a grinds or scrunched leaves (commonly denoted herein after also hot beverage base material (HBBM)) heating unit adapted to receive a determined amount of HBBM in a respective cavity, to roast the HBBM prior to brewing it by means of hot water provided by the hot water assembly; a HBBM stirring unit, adapted to stir the HBBM in the heating unit, and a control unit, adapted to control the operation of the hot water unit, the HBBM heating unit and the stirring unit.

In some embodiments the materials of the HBBM may be one of coffee grinds, cacao grinds and scrunched tea leaves and the like, beverage preparation material that may be provided in a form of very small grinds or scrunched leaves and may require certain step of heating and/or roasting prior to brewing or extraction by hot water.

In some embodiments the device further comprising pressure control means to control the pressure of water developed within the HBBM during brewing.

In some embodiments the HBBM heating unit is adapted to receive HBBM packed in a capsule.

According to yet additional embodiments the capsule may have means adapted to control the pressure of water developed inside the capsule during brewing.

In some embodiments the heating means unit comprises at least one of ohmic element, RF generator and antenna and hot air flow.

In some embodiments the stirring means of the device comprise one from a list consisting mechanical vibrations inducing unit, mechanical rotation inducing unit, and air blowing unit. In yet additional embodiments the stirring means further comprise rod to transfer stirring movements to a stirrer disposed inside a coffee capsule.

In some embodiments the device further comprising pressure regulating means adapted to control the pressure of water developing in the cavity during brewing. According to yet additional embodiments the pressure regulating means comprise springy element allowing flow barrier disposed in the flow path of brewing water after the cavity adapted to accommodate coffee grinds.

A method for preparing hot beverage is disclosed comprising providing a defined amount of HBBM that is in non-roasted or partially roasted form to a cavity in a heating and stirring device; heating the HBBM to a defined temperature for a defined period of time and providing stirring to the HBBM during the heating time; brewing the HBBM by providing water at a determined temperature and determined pressure to the HBBM in a desired pressure of the water in the HBBM cavity and allowing the water that flow through the HBBM to pour into a cup.

According to some embodiments the heating time period, temperature and the stirring profile provided to the HBBM prior to the brewing step is determined based on the nature of the HBBM and the desired nature of the resulting drink. According to some embodiments the HBBM is packed in a capsule.

According to yet additional embodiments the capsule further comprising means adapted to control the pressure of water developed inside the capsule during brewing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
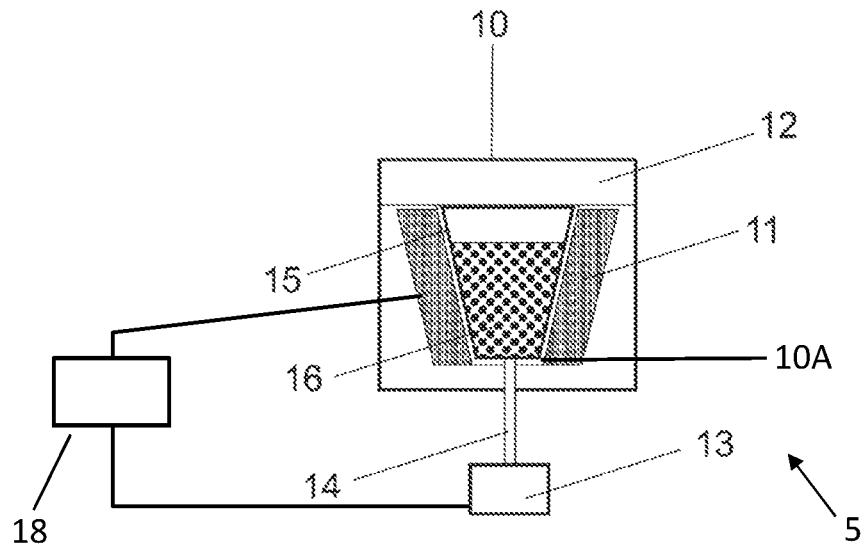
FIG. 1 is a schematic illustration of grinds heating and stirring assembly, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Method, system and capsule are described which enable end users to roast on-the-spot green or semi-roasted coffee grinds, packed in a single use or multi use capsule, to a desired degree that will influence the flavor of the prepared beverage. The process may then continue directly to brew the pre-packed capsulated grinds in the same process and the same system to a perfectly controlled cup of coffee. The inventions enable to produce a single cup of coffee or a small amount of done beverage, and not to brew a full carafe or kettle (as in some existing use cases present in the market). The invention enables to achieve the freshest cup of coffee where the end user can control the flavor of the brewed coffee (thus capable of achieving various flavors from the same capsule), utilizing a highly efficient system, capsule and method in a most convenient, simple, clean and fast process.

One aspect of the embodiments of the invention relates to means and method for uniform roasting of capsulated green or semi-roasted coffee grinds. Coffee may be roasted in the temperature range of 190° C. to 250° C. In order to reach these temperatures, a heating source is required. The heating source may apply conduction heating means or radiation heating means. Conduction-heating means transfer heat energy from the outside of the grinded particle to its interior, thus having a thermal gradient inside the grind (from almost burnt on the exterior to substantially completely unroasted in the interior), which implies on the overall flavor of the coffee. This is also valid when dealing convection-heating means. On the other hand, radiation-heating means transfer heat energy mainly to the liquids inside the grinded particles (e.g. water and oils) thus heating the complete particle in an even manner, and is more preferred in order to achieve a uniform roast per a single particle.

In both heating methods, there is a need to stir the grinds in order to even the heat dissipation between them. Internal stirrers, air circulation, rotation of the packed capsule and applying vibrations to the capsule are examples of stirring methods according to embodiments of the present the invention.

Another aspect of the invention relates to methods and means for achieving a perfect brew of the freshly roasted coffee. There is great significance to the coffee grind particle size on the brewing process and the coffee's overall flavor. When roasting coffee, the roasted coffee beans and/or grinds increase their volume by up to twice their original size while losing weight up to 20% of the original weight.

In existing capsule based systems as known in the art, the coffee is first roasted before grinded eliminating the need to "size compensate": the coffee grinds are grinded to a fixed level and the capsule lid assures that the capsule will start pouring coffee to the user's cup only at a predefined pressure. In a system where the coffee grinds size is not fixed and their size may be dictated by the user (according to his desired roasting level), there is a need for such a variable "size compensation" method.

Additional aspect of embodiments of the invention relates to a valve disposed in the disposable capsule/multi use capsule or installed inside the system. The valve may open and allow the brewed coffee to exit into the users' cup only at a predefined pressure. Applying such valve may optimize the brewing procedure. In current capsule based systems, once the pressure inside the capsule had reached its' setpoint level the capsule lid will tear open and will allow the coffee to brew into the users' cup. The brewing pressure after the capsule lid has torn open reduces significantly and rapidly, reaching the atmosphere pressure very fast. This means the majority of the coffee is brewed not under set brewing pressure, but under an atmospheric pressure. When applying a valve according to embodiments of the present invention, the process takes place under an even and continuous optimized pressure for coffee brewing.

Reference is made now to FIG. 1, which is a schematic illustration of grinds heating and stirring assembly 5, according to embodiments of the present invention. Grinds heating and stirring assembly 5 may comprise heating unit 10 and stirring unit 13. Heating unit comprises heating element 11 which may be disposed at least partially surrounding cavity 10A adapted to accommodate capsule 15 which comprise grinds 16, such as coffee grinds. The cavity 10A may be capped to form a closed space by lid 12. Stirring unit 13 may be connected mechanically to heating unit 10 via, for example, rod 14 adapted to convey the stirring movements from stirring unit 13 to heating unit 10. Heating element 11 may be an ohmic element. Stirring element 13 may be a vibrating producing unit, such as electrical motor, vibrator, etc. When stirring unit 13 is activated it induces mechanical vibrations to heating unit 10 and thus to a capsule inserted to the capsule cavity 10A made in it.

According to some embodiments capsule 15 may be filled with defined amount of green grinded coffee beans or semi roasted grinded coffee 16, that was roasted to the level a little bit lower the level considered as "light roast". Capsule 15 may be filled so as to leave some head space inside the capsule free and not filled. This is done to allow the coffee grinds free space in which they can be stirred around.

When heating element 11 in heating unit 10 is turned on, it may rise its temperature to a peek desired temperature such as of 250° C. Stirring unit 13 may be turned on simultaneously or in a time difference chosen by the user, thereby causing the content of capsule 15 to be stirred. As a result, the packed grinds 16 may rotate and mix inside capsule 15. Grinds that temporarily touch the capsules inside faces or reside close to the inside faces of the capsule begin to roast, due to the heat transferred from heating element 11 to the capsules' shell. The internal space of capsule 15 is also. Convection of heat from the inner faces of capsule 15 is done through the heat transfer capability of grinds 16, thereby heat is transferred inwardly form the inner faces of capsule 16 towards its center and as a result heating gradually grinds that are not very close to the inner faces of capsule 16. Heat is transferred to all grinds via conduction. After a defined period of time, for example no longer than 90 seconds, heating element 11 and stirring unit 13 may be turned off. In an experiment carried with a capsule holding 7 gr of grinds that was subjected to 90 seconds of heating to 250° C. and to stirring, the capsules content was examined and it was found that the coffee was roasted to a full roast and it was visually confirmed that the roast was applied evenly to all grinds. Control unit 18 may be adapted to control the temperature provided by heating unit 11 and the stirring sequence of stirring unit 13. Control unit 18 may be any known controller or control means. For example, control unit may be embodied as part of control means of an assembly in which heating and stirring assembly 5 is integrated.

Figure 2:
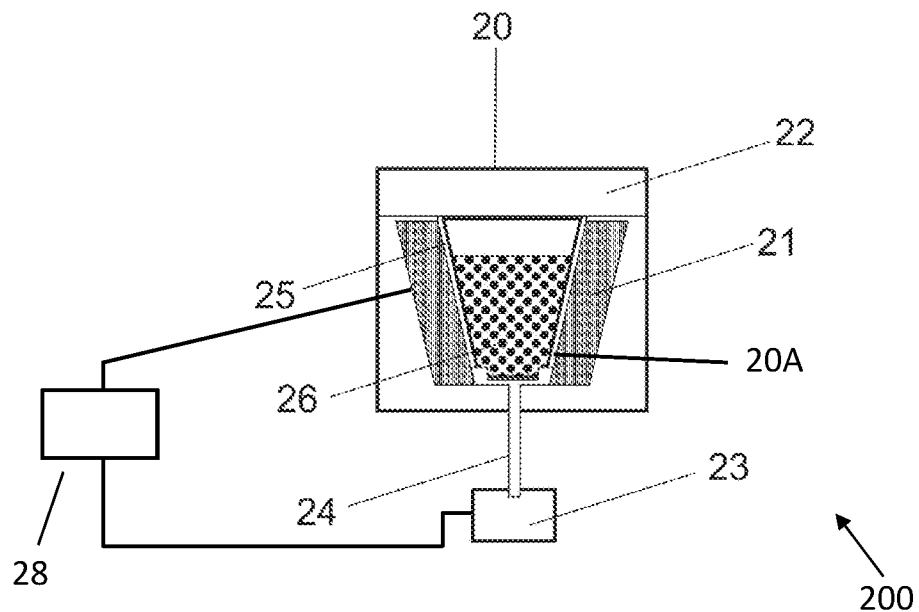
FIG. 2 is a schematic illustration of a grinds heating and stirring assembly, according to embodiments of the present invention.

Reference is made now to FIG. 2, which is a schematic illustration of grinds heating and stirring assembly 200, according to embodiments of the present invention. Grinds heating and stirring assembly 200 may comprise heating unit 20 and stirring unit 23. Heating unit comprises heating element 21 which may be disposed at least partially surrounding a cavity 20A adapted to accommodate capsule 25 which comprise grinds 26, such as coffee grinds. The cavity may be capped to form a closed space by lid 22. Stirring unit 23 may be connected mechanically to heating unit 20 via, for example, rod 24 adapted to convey the stirring movements from stirring unit 23 to heating unit 20. Heating element 21 may be an ohmic element. Stirring element 23 may be a rotation producing unit, such as electrical motor, etc. when capsule 25 is closed inside the cavity 20A it remains free to rotate inside the cavity 20A. When stirring unit 23 is activated it induces mechanical rotations via rod 24 to capsule 15 to which is may be gripped by gripping means. Grinds heating and stirring assembly 200 may operate similarly to grinds heating assembly 100, with the required small changes.

In another experiment grinds heating and stirring assembly 200 was activated to roast capsule 26. A metallic aluminum capsule 25, filled with 7 gr. of green coffee 26, grinded to just below the level considered as "light roast", and with free space inside the capsule left for the grinds to mix and stir. Heating element 21 was turned on, reaching the peek temperature of 250° C. Stirring unit 23 was turned on simultaneously. The motor of stirring unit 23 was rotated in four different manners: first manner comprised continuous rotation in a single speed, second manner comprised continuous rotation in varying speeds, third manner comprised alternatingly rotating and stopping rotations of rod, and fourth manner comprised alternatingly rotating rod 24 in the different direction of rotation. Heat transfer through the content of grinds 26 in capsule 25 was similar to the heat transfer described above with respect to FIG. 1. After a period of time no longer than 90 seconds, heating element 21 and stirring unit 23 were turned off, and the capsules content 26 was examined. The inspected coffee was roasted to a full roast and it was visually confirmed that the roast was applied evenly to all grinds, except in the case when the motor rotated in a continuous single speed (first stirring manner), where the uniformity of the roast was less than 100%. According to some embodiments capsule 25 may be provided with several internal ribs protruding from the inner faces of the capsule, to induce better mixing, stirring and evenly spreading heat in the capsule content. Control unit 28 may be adapted to control the temperature provided by heating unit 21 and the stirring sequence of stirring unit 23. Control unit 28 may be any known controller or control means. For example, control unit may be embodied as part of control means of an assembly in which heating and stirring assembly 200 is integrated.

Figure 3:
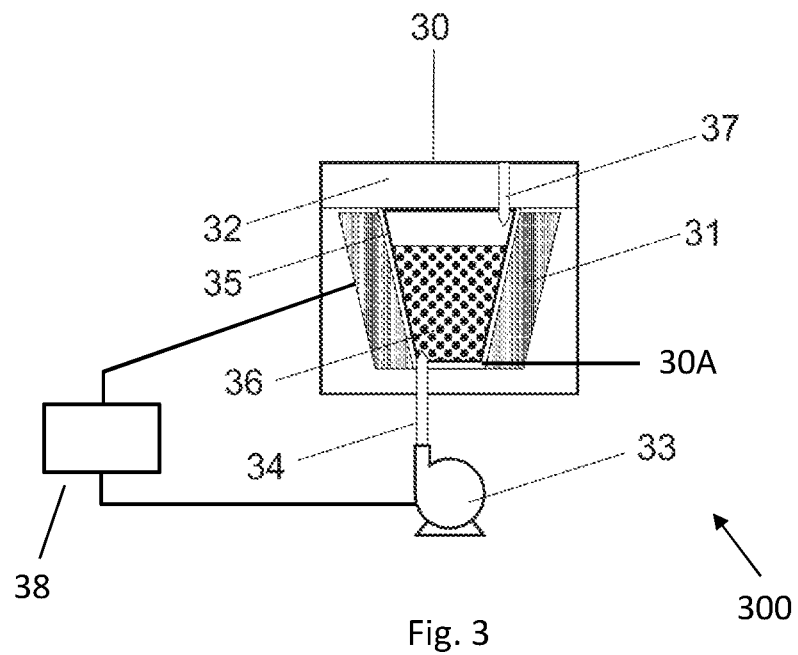
FIG. 3 is a schematic illustration of a heating and stirring assembly, according to embodiments of the present invention.

Reference is made now to FIG. 3, which is a schematic illustration of heating and stirring assembly 300, according to embodiments of the present invention. Assembly 300 is designed to stir the content of a capsule using air flow, as described herein below. Assembly 300 comprise heating unit 30 and stirring unit 33. Heating unit comprises heating element 31 which may be disposed at least partially surrounding a cavity 30A adapted to accommodate capsule 35 which comprise grinds 36, such as coffee grinds. The cavity 30A may be capped, to form a closed space, by lid 32. A stirring sub-assembly may comprise air blower 33 connected via air tube and piercing means 34 to inside cavity 30A. the stirring Sub-assembly may further comprise air vent and piercing means 37, that may be adapted allow air inside cavity 30A with pressure higher than the ambient pressure to flow out of cavity 30A. The piercing ends of both tube 34 and tube 37 protrude into cavity 30A to an extent ensuring that when a capsule is inserted into cavity 30A and lid 32 is tightly closed, both piercing ends will pierce the walls of the inserted capsule, thereby forming an air flow path from tube 34 to vent tube 37 via the capsule. The relative locations of the piercing ends of tubes 34 and 37 may be selected to ensure good stirring of the content of the capsule, as shown schematically in FIG. 3. According to some embodiments a filter may be disposed in tube 37 (Not shown), to prevent exit of coffee grinds when air is blown from blower 33 via tube 34, capsule 36 and towards tube 37.

In an experiment performed with assembly 300, into cavity 30A metallic capsule 35 was inserted, filled with 7 gr. of green grinded coffee beans or semi roasted grinded coffee 36, roasted to just before the level considered as "light roast", with some empty space left in the capsule free and not filled to enable volume expansion of the grinds. When lid 32 was tightly closed capsule 35 was pierced by piercing ends of tubes 34 and 37. Heating element 31 and the blower/air pump 33 were simultaneously turned on. The grinds 36 where mixed by the air flow urged by blower. Apparently, grinds 36 in capsule 35 received more heat energy when meeting other heated grinds during the air stirring process. Heat transferred to all grinds via conduction. The overall heating and stirring process resembles convection heating methods. After a period no longer than 160 seconds, the heating element 31 and air blower 33 were turned off, and the capsule's content was examined. The coffee was roasted to a full roast and it was visually confirmed that the roast was evenly applied evenly to all grinds. Control unit 38 may be adapted to control the temperature provided by heating unit 31 and the stirring sequence of stirring unit 33. Control unit 38 may be any known controller or control means. For example, control unit 38 may be embodied as part of control means of an assembly in which heating and stirring assembly 300 is integrated.

Figure 4:
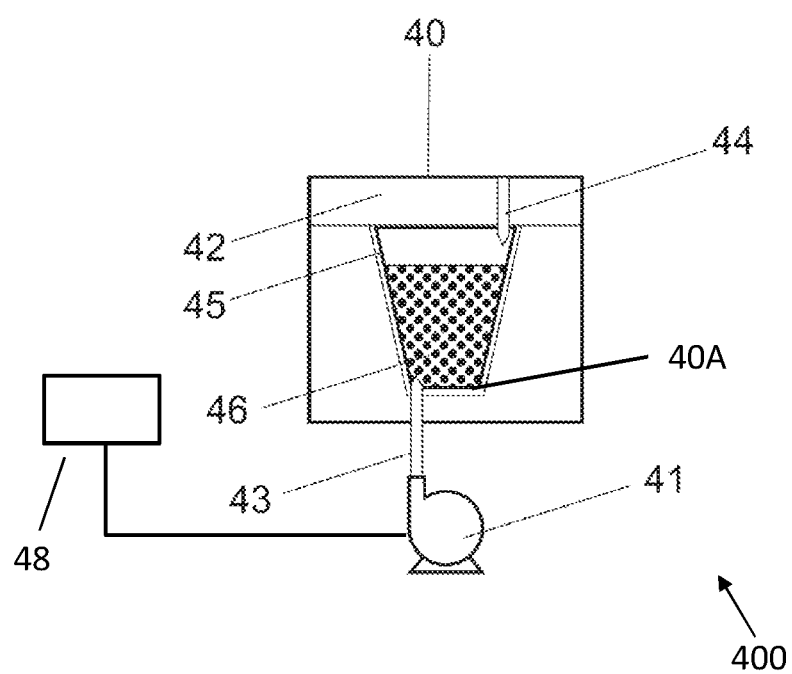
FIG. 4 is a schematic illustration of a heating and stirring assembly, according to embodiments of the present invention.

Reference is made now to FIG. 4, which is a schematic illustration of heating and stirring assembly 400, according to embodiments of the present invention. Assembly 400 is designed to heat stir the content of a capsule using heated air flow, as described herein below. Assembly 400 comprises housing 40 and housing lid 42 having made in its cavity 40A adapted to accommodate capsule 45. Assembly 400 further comprising heating and stirring sub-assembly unit 41. Heating and stirring sub-assembly 41 may comprise hot air blower/air pump and heater 41 that may be connected via air tube and piercing means 43 to inside cavity 40A. Heating and stirring sub-assembly 41 may further comprise air vent and piercing means 44, that may be adapted allow air inside cavity 40A with pressure higher than the ambient pressure to flow out of cavity 40A. The piercing ends of both tubes 43 and 44 protrude into cavity 40A to an extent ensuring that when a capsule is inserted into cavity 40A and lid 42 is tightly closed, both piercing ends will pierce the walls of the inserted capsule, thereby forming an air flow path from tube 43 to vent tube 44 via the capsule. The relative locations of the piercing ends of tubes 43 and 44 may be selected to ensure good stirring of the content of the capsule, as shown schematically in FIG. 4. According to some embodiments a filter may be disposed in tube 44 (Not shown), to prevent exit of coffee grinds when hot air is blown from blower 41 via tube 43, capsule 45 and towards vent tube 44.

An experiment with assembly 400 and a capsule of coffee grinds was held. A heat durable plastic, such as Polybutylene terephthalate (PBT) or PPS (Polyphenylene sulfide) was inserted into cavity 40A. The capsule 45 was filled with 7 gr. of green grinded coffee beans or semi roasted grinded coffee 46 (that was roasted to just before the level considered as "light roast"), leaving some head space inside the capsule free and not filled. This was done to allow the coffee grinds (46) space where they could turn around, resembling a fluid bed dryer. The hot air blower 41 was turned on. The grinds 46 where heated and mixed by the hot air. The heat energy from the hot air roasted the mixing grinds via convection. After a period no longer than 120 seconds, the hot air blower 41 was turned off, and the capsules content was examined. The coffee was roasted to a full roast and it was visually confirmed that the roast was evenly applied to all grinds.

All the above experiments presented a uniform roast visual inspection. The color of the grinds matched the desired roast level of "city roast" and the scent of the roasted coffee matched as well. The duration of the roast was a direct outcome of the heat transfer inside the capsule. The ohmic heating element performed well if the grinds were mixed via vibration or rotation. It did not perform best when the circulation was done via air as in the embodiments of FIGS. 3 and 4 while air does not transfer heat well (but rather isolates it) the duration of ohmic applied heat with air circulating means required the longest duration. The last option of circulating hot air proved as valid, but duration-wise it required longer process than the other options.

After the visual inspection, the roasted coffee from each experiment was brewed in order to taste the result. The flavor did not meet the expectations of "city roast". In all cases, although the visual inspection presented a uniform dark roast, the taste of the coffee was a mixture of "bitter" (indicating that the desired roast level was achieved) and "acidic" (indicating of an under roast) which indicated that the uniformity of the roasting was not satisfying.

This can be explained that due to the small size of the coffee grind particle, the external areas of the grind achieve the required roast level very fast, while its' internal remains under roasted or even not roasted at all. If the roasting temperature will decrease, the roasting process will be slower but roasting per particle will be more uniform (as the heat will build up slowly inside the grind particle). However, in the point of view of the end user, this process will be too long for a single cup of coffee, thus making it irrelevant. Control unit 48 may be adapted to control the temperature and the stirring sequence provided by heating and stirring sub-assembly unit 41. Control unit 48 may be any known controller or control means. For example, control unit 48 may be embodied as part of control means of an assembly in which heating and stirring assembly 400 is integrated.

Figure 5:
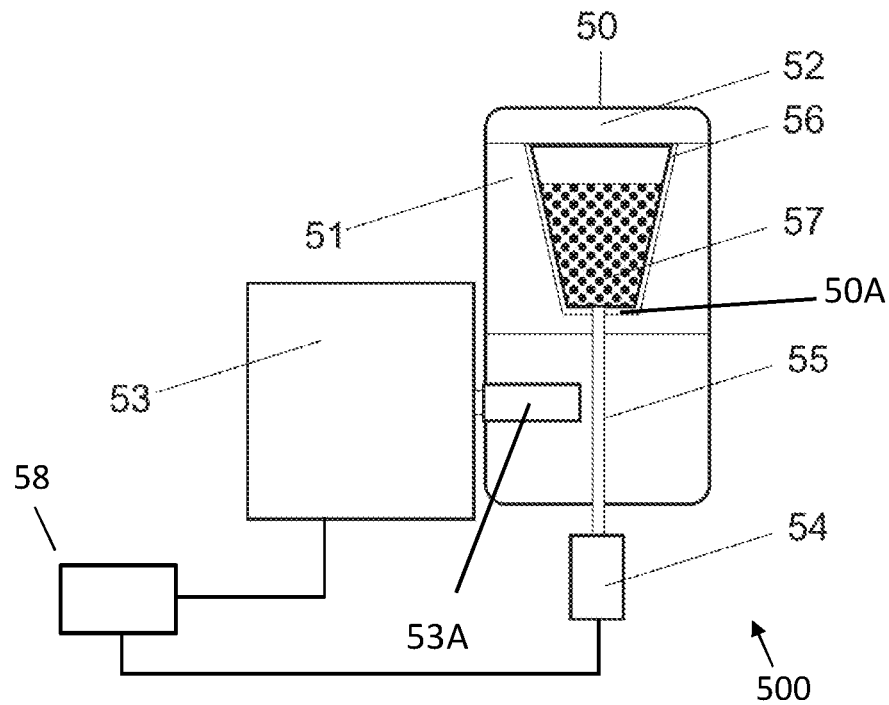
FIG. 5 is a schematic illustration of a heating and stirring assembly adapted to roast coffee grinds, according to embodiments of the present invention.

Reference is made now to FIG. 5, which is a schematic illustration of heating and stirring assembly 500 adapted to roast coffee grinds, according to embodiments of the present invention. Assembly 500 comprising capsule housing 50, microwave heating generator sub-assembly 53 consisting of an RF generating antenna connected to an RF source, such as a magnetron, and stirring sub-assembly 54. Capsule housing 50 comprise housing body 51 and housing lid 52/cavity 50A is made in housing body adapted to accommodate capsule 56 in it and further to allow stirring sub-assembly 54 to provide vibrations movements to capsule 56 in cavity 50A via connecting means 55 adapted to transfer stirring movements to capsule 56 in cavity 50A without interfering with microwave energy transmitted by microwave generator 53 to capsule 56.

Using RF simulation computer aided design (CAD) software, microwave generator 53 for roasting small amount of coffee, such 7 gr. of coffee was miniaturized to dimensions as small as 60 mm×60 mm×100 mm. The geometry of the RF transfers chamber 53A the reaction chamber 50A and their position with respect to the capsule and its content were optimized to reduce reflections back into the microwave generator (e.g. magnetron) source 53 and to obtain homogeneous heating across the chamber.

The microwave generator 53 was tightly mounted on the microwave cavity 50A, to eliminate microwave energy radiation loss due to leaking out. The system that was used according to embodiments of the present invention and its performance was measured and proved compliance with radiation safety regulations when operated with a standard 1 kW magnetron.

In an experiment of assembly 500 a plastic capsule 56 made from heat durable and relatively RF transparent polymeric material, such as PBT or PPS (Polyphenylene sulfide) was inserted into cavity 50A. The capsule 56 was filled with 7 gr. of green grinded coffee beans or semi roasted grinded coffee 57 (that was roasted to just before the level considered as "light roast"), leaving some head space inside the capsule 56 free and not filled.

The microwave generator 53 and the stirring sub-assembly 54 were turned on simultaneously. The heat energy radiated from the magnetron 53 was provided during different processes for different periods of time, e.g. for 20, 25, 30, 33 and 35 seconds. Each time the outcome was examined. The examination showed that the coffee was roasted to a full roast in different degrees of roasting, matching the different heating durations and it was visually confirmed that the roast was evenly applied to all grinds.

Figure 5A:
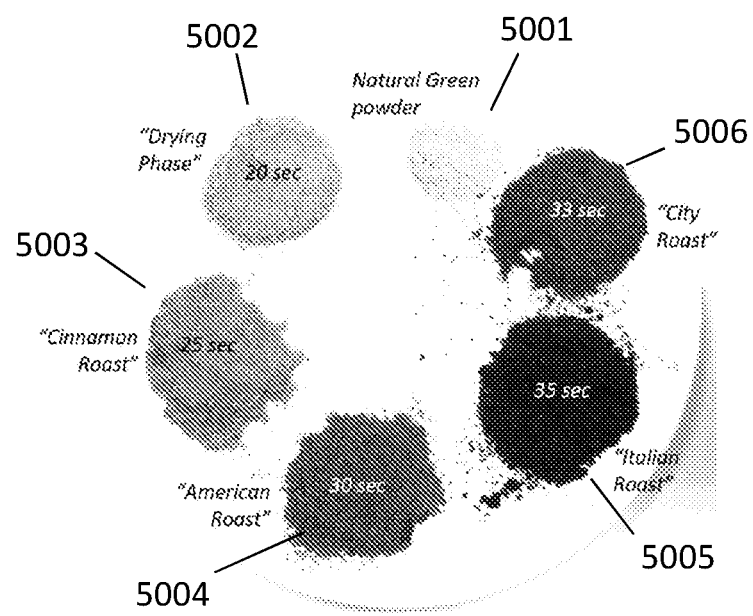
FIG. 5A presents six samples of coffee grinds in six different stages of roasting, differing by the time of roasting, according to embodiments of the invention.

Reference is made now to FIG. 5A which presents six samples of coffee grinds in six different stages of roasting, differing by the time of roasting, according to embodiments of the invention. In each experiment, the RF generator was turned on for a different duration of time. Example 5001 presents coffee grinds before roasting. Example 5002 presents coffee grinds after 20 seconds of roasting ("drying phase"). Example 5003 presents coffee grinds after 25 seconds of roasting ("cinnamon roast"). Example 5004 presents coffee grinds after 30 seconds of roasting ("American roast"). Example 5005 presents coffee grinds after 35 seconds of roasting ("Italian roast"). Example 5006 presents coffee grinds after 33 seconds of roasting ("city roast"). As depicted in FIG. 5A different levels of roasting can be obtained for the same testing sample of coffee grinds. Similar level of freedom in the resultant level of roasting may be achieved by adjusting the RF generator power, while keeping the roasting time constant.

The assembly of FIG. 5 was used in another experiment, where same capsule was inserted but the stirring sub-assembly 54 was operated in four different patterns in time while the microwave generator 53 was on during this time. In the first pattern the stirring sub-assembly 54 was operated continuously in a single speed. In a second pattern of operation stirring sub-assembly 54 was operated continuously in varying speeds. In a third pattern of operation stirring sub-assembly was operated for pre-defined short periods of time with stops periods between them. In the fourth pattern of operation stirring sub-assembly 54 was operated as in the third pattern but the direction of rotation was changed each time. After a period no longer than 70 seconds, the microwave generator 53 and stirring sub-assembly 54 were turned off, and the capsule's 56 content was examined. The examined coffee was roasted to a full roast and it was visually confirmed that the roast was evenly applied to all grinds, except in the case of the first pattern where the uniformity of the roast was not 100%. Control unit 58 may be adapted to control the temperature provided by microwave generator 53 and the stirring sequence of stirring sub-assembly 54. Control unit 58 may be any known controller or control means. For example, control unit 58 may be embodied as part of control means of an assembly in which heating and stirring assembly 500 is integrated.

Figure 6:
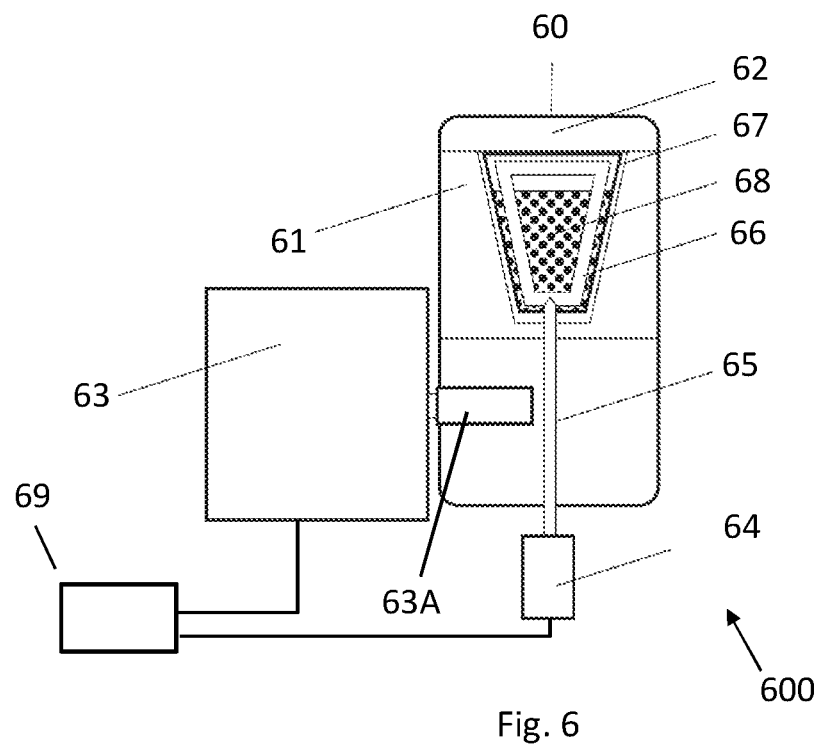
FIG. 6 schematically presents a heating and stirring assembly adapted to provide another embodiment of stirring a content of a capsule, according to embodiment of the present invention.

Reference is made now to FIG. 6, which schematically presents heating and stirring assembly 600, adapted to provide another embodiment of stirring a content of a capsule, according to embodiment of the present invention. Like elements of assembly 600 and assembly 500 described above have similar reference numbers where reference number 6x depicts structural element equal or similar to element 5x in FIG. 5. Capsule 67 differs from capsule 56 of FIG. 5 in that is contains, built in it, stirrer unit 66 that is adapted to mechanically connect to stirring rod 65 when capsule 67 is inserted into its cavity in assembly 600, and is pierced by the edge of rod 65 farther from stirring sub-assembly 64, thereby allowing rod 65 to rotate stirrer unit 6 when it turns. Heating and stirring assembly 600 was operated so that microwave generator 63 and the stirring sub-assembly 64 were turned on simultaneously for a period of 60 seconds. The grinds 68 mixed inside the capsule 67 by the stirrer 66.

In this experiment it is optional to produce the stirrers from a metallic material or coating, applying a dual role on the stirrer: a mixing element that acts as a susceptor. Susceptive materials function as efficient microwave (MW) absorbers both inside a cavity and in open space. Thus, adding a susceptive material inside a capsule or using a susceptive material to form the capsule may positively increment roasting process efficiency. MW susceptive materials in the form of powder, needles and thin films may be used inside the capsule, or as a component in the structure of the capsule, to improve the efficiency of the roasting process. Susceptive materials include, without limitation, aluminum flakes, ceramics, metallized films and other materials known in the art to exhibit a rapid temperature increase in proportion to applied MW power ("susceptance"). Susceptive elements placed inside the capsule absorb MW energy and contribute directly to heating the low absorbing material (such as coffee grinds) to enable optimization of the roasting process. Control unit 69 may be adapted to control the temperature provided by microwave generator 63 and the stirring sequence of stirring sub-assembly 64. Control unit 69 may be any known controller or control means. For example, control unit 69 may be embodied as part of control means of an assembly in which heating and stirring assembly 300 is integrated.

Figure 7:
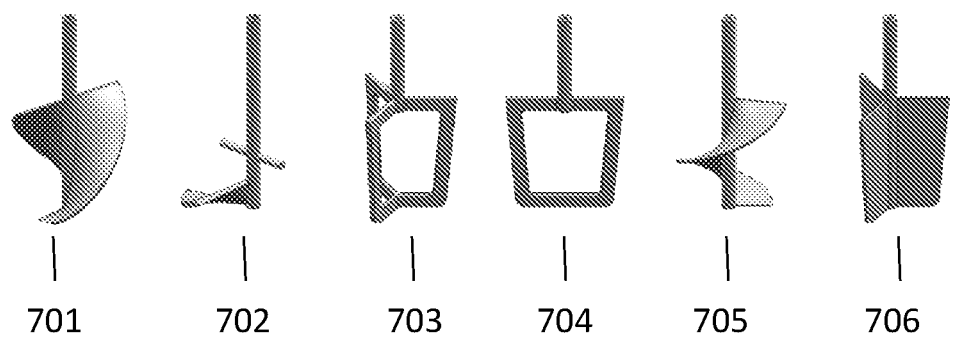
FIG. 7 depicts six different stirrers which examined in the embodiment of FIG. 6, according to embodiments of the present invention.

Reference is made now to FIG. 7 which depicts six different stirrers, 701-706. examined in the embodiment of FIG. 6 described above, according to embodiments of the present invention.

The roasted grinds from all the experiments held in the microwave chamber that were visually inspected as mixed in a uniform manner were brewed and tested for flavors. In this case, the flavor of the done beverage was this of a good roasted coffee. Full, round & richer flavors appeared as well the outcome of the short period the freshly roasted coffee waited before the brewing procedure.

Concluding the above described roasting experiments and crossing it with the requirements of a valid acceptable appliance aimed for the end user, it was proven that—
  Radiation heating methods, as opposed to conduction and convection heating methods are better fit for roasting green grinded coffee in terms of flavor and duration of the process.
  Good mixing of the capsulated grinded coffee is extremely important for a uniform roast.
  From all the mixing methods described above, the optimum results achieved where stirring was in the form of rotating the capsule and/or vibration forces applied on the capsule.

Additional conclusions that were received from the experiments are:
  Using semi roasted grinded coffee (roasted to a level just before the level considered as "light roast") is easier to roast in a uniform matter than green grinded coffee beans, as the powder is less moist; The presence of moisture during the roasting procedure of powder may often cause the powder to granulate. This affects the uniformity of the roasting procedure. Nevertheless, roasting green grinded powder is possible when combining several mixing options, such as radiation while vibration forces are applied together.
  The particle size of the grinds at the end of the capsulated roasting process was significantly larger than the size of particles entering it. Also, it was visually inspected that the grind size differed from one roasting level achieved inside the described roasting means than another roasting level. When the roasting level was rather low (such as "medium roast" or "high roast") the particles gathered relatively low to medium increase in volume, while achieving higher roasting levels (such as "city roast", "full city" and up to "French roast" and "Italian roast") the particles gathered a relatively high increase in volume.

The change in coffee grinds particle size affects directly the brewing process because the water brewing the grinds pass through the grinds at different pressure and thus in different time periods, and affect the optimization of the brewing and the overall flavor of the beverage in the end users cup. For example, in Arabica type coffee grinds volume increase ranges from 40% to 70% dependent on the temperature and the duration of exposure to that temperature (thus the roast level) while mass losses are in the range of 10% to 20%, and in Robusta type coffee grinds volume increase ranges from 48% to 57% while mass losses are in the range of 10% to 17%. In general, the volume of the grinds grows in direct proportion to the level of roasting while the weight of the grinds is inversely proportional to the level of roasting. See for example in http://www.scielo.br/scielo.php?script=sci_arttext&pid=S0101-20612012000300004&sa=U&ei=a-IFVb23MgTbsASEulCoAQ&ved=0CCsQ9QEwCg&usg=AFQjCNHlwR2vcnklw_S-kBtbt-eXNQacfA and in: http://www.happygoatcoffee.com/blogs/blog/5940979-home-coffee-roasting-fun-and-easy.

In order to brew a professional cup of coffee it is known from the professional literature that there are several rules that should be met. First, coffee weight before brewing should be 7-9 gr; second, brewing water temperature should be 92°-96° Celsius; third, brewing water pressure should be 9 bars; fourth, Volume of beverage should be 20-30 ml (varying from "Ristreto" 20 ml and up to "Lungo" 30 ml). Not complying with the above criteria will end up in a burnt/diluted/other non-rewarding and disappointing cup of coffee.

Another factor that implies on the above criteria is the coffee grind size and the brewing duration (the brewing process occurs when hot water passes through the coffee grinds in the exact predefined pressure and duration. It is known that the optimal duration for this process in the above-mentioned criteria is 20-25 seconds. In large coffee grinds (coffee grinds from course grinding), the water during brewing will pass relatively fast through the capsule/coffee dose and therefore may not entirely brew the coffee. This may be indicated by a very low-pressure rise of the brewing water during the brewing process. The pressure will not reach the desired 9 bars, or even if it will it will be for a short time and not through the entire brewing process. On the other hand, in capsule/coffee dose with very small grinds (coffee grinds from fine grinding) the opposite may occur. Water will pass too slow through the coffee and will burn it due to overheating the coffee grinds. This may be indicated by a pressure rise above 9 bars and the brewing time will be significantly longer, for example past the 30 seconds.

As a mean of controlling the above mentioned coffee preparation parameters, a professional barista knows how much to press and compress the coffee grinds in the coffee group head, and as a result to control the pressure and duration of the brewing process in order to compensate for variations in the coffee grinding size.

Right water temperature, a perfect relation between the coffee grind size, coffee weight and right compression of the coffee will provide a perfect cup of coffee by all the criteria mentioned.

Embodiments of the present invention enable the user to finalize the coffee roast at home to a desired degree and thus achieve a very large variance of flavors from the same capsule as he/she may desire, from light roast that will brew a slightly sweet, "greenish" light cup of coffee to a dark roast that will brew a bitter, "bold", weighty cup of coffee. During the brewing process there is a significantly large change in the brewing pressure. The coffee weight and brewing water temperature may be set as is known in the art. However, the grinds particle size varies and a mean to compensate this variance is required in order to achieve the correct required brewing pressure, for example 9 bars.

According to embodiments of the resent invention a water pressure valve may be disposed on the coffee brewing path, located for example after the coffee grinds, that opens only when the pressure before it rises to the predefined pressure thus brewing the coffee in the required predefined pressure. The valve can be rigid and act as a shutter, or flexible and act as a membrane.

The valve can be located as part of a system, in locations on the coffee flow path beyond the coffee grinds, such as in the coffee group handle as a replacement or in addition to the coffee cup filter, or even in the conduits on the path of the brewed coffee exiting from where the coffee grinds are located and into the cup.

The valve may additionally or alternatively be implemented in coffee pods and/or capsules at the side of the pod/capsule, opposite side to the water entering the pod/capsule in addition or instead of a filter. These capsules can be for single use or multi use.

The valve can be a mechanical valve if placed inside the system and/or capsule, or an electrically operated valve if disposed in the system. The embodiment of the electrically operated valve may enable the user to control the brewing. If an electrically operated valve is applied, a sensor of the pressure inside the capsule may be used for operating the electrical valve according to the pressure set by the user.

Figure 8:
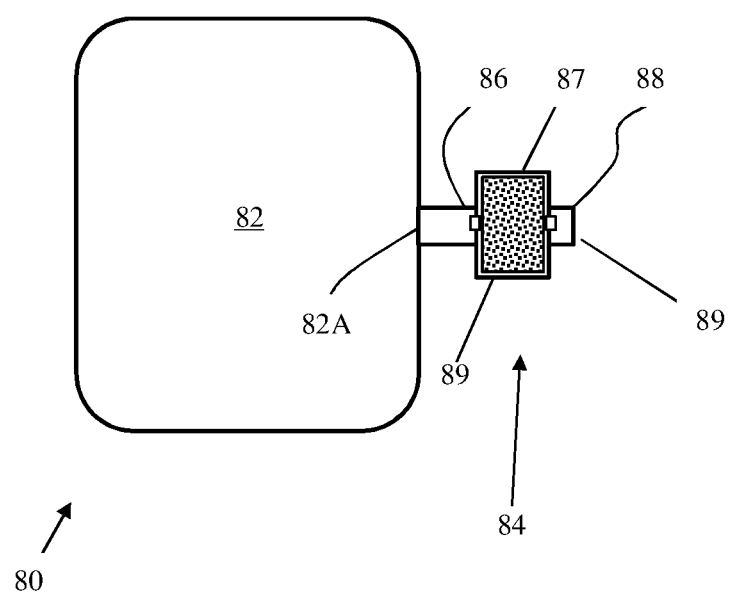
FIG. 8 schematically presents in a coffee preparation system optional locations for disposal of water pressure regulator/valve, according to embodiments of the present invention.

Reference is made now to FIG. 8 which schematically presents in coffee preparation system 80 optional locations for disposal of water pressure regulator/valve, according to embodiments of the present invention. System 80 may comprise assembly 82 for holding water, heating the water, controlling the temperature and pressure of the water in a hot water reservoir (included in assembly 82, not shown) adapted to provide, upon request or control signal, hot water at a pressure level that is not lower than first predefined level WP1. Control of the water parameters may be carried out, for example, by any one of the control units described with respect to FIGS. 1-6 above. Water at a desired temperature and pressure level that is equal to or higher than WP1 may leave assembly 82 through outlet 82A. At outlet 82A coffee head 84 may be disposed. Coffee head 84 may comprise housing 87 adapted to accommodate coffee grinds or powder 89. Hot and pressurized water may enter housing 87 via housing inlet 86 to fill the cavity of housing 87. At the outlet 88 of housing 87 a pressure regulating valve may be disposed, designed to open only when the pressure at its first side that faces the cavity of housing 87 rises beyond a predefined pressure, e.g. coffee preferred pressure CPP. CPP may be lower than WP1. According to this embodiment brewing of the coffee is done in the predefined pressure, and only when the pressure rises above this predefined level the brewed water pours out via outlet 88 for example into a cup, while the pressure inside housing 57 is kept substantially at CPP until water supply to housing 87 stops. The valve can be rigid and act as a shutter, or flexible and act as a membrane.

Figure 9:
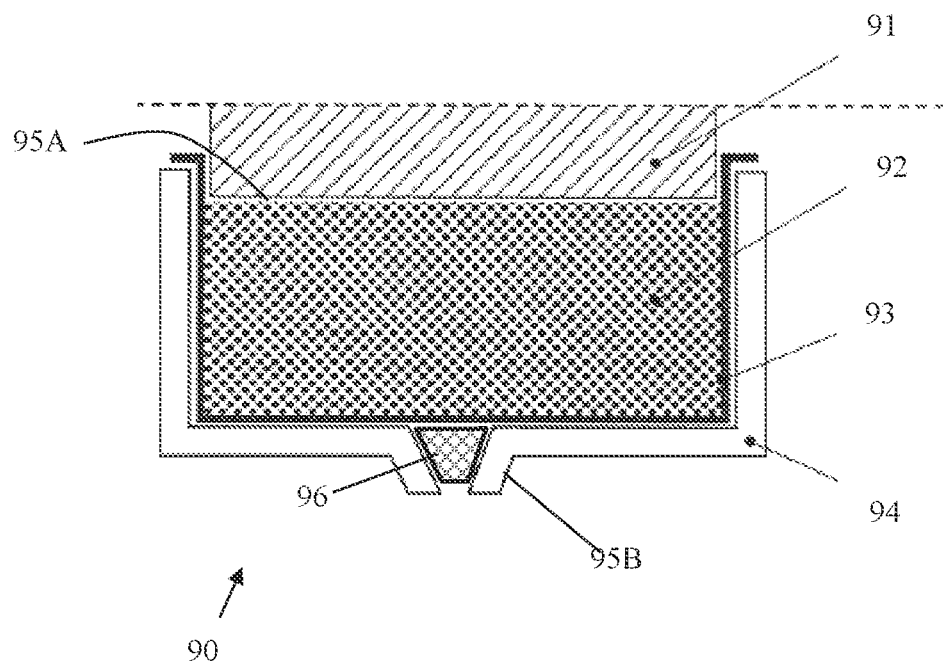
FIG. 9 schematically depicts a coffee head, according to embodiments of the invention.

Reference is made now to FIG. 9 which schematically depicts coffee head 90, according to embodiments of the invention. Coffee head 90 may be connected at a first end to water preparation assembly the end of which is marked 91, similar to assembly 82 in FIG. 8. Coffee head 90 may comprise housing 94 having first opening 95A facing the water preparation assembly and second opening 95B, configured to allow exit of prepared coffee for example to a cup. Coffee ingredients 92, such as coffee grinds or coffee powder may be housed directly inside housing 94, or be pre-capsulated in a capsule or a porous bag or a porous container 93, adapted to be accommodated inside housing 94. Pressure regulating valve 96 may be disposed at, or close to outlet 95B, at its side facing inside of housing 94.

Valve 96 may be disposed as part of coffee head 90, in locations along the coffee preparation path, downstream of the coffee grinds as a replacement, or in addition to a coffee cup filter, or in the conduits on the path of the brewed coffee after outlet. In other embodiments valve 96 may be implemented disposed in coffee pods and/or capsules on side of the capsule from which the prepared coffee exits the pod/capsule (also called the bottom of the pod/capsule), at the opposite side to the side where water entering the capsule, in addition to, or instead of a filter. These capsules may be for a single use or multi use.

Figure 10A:
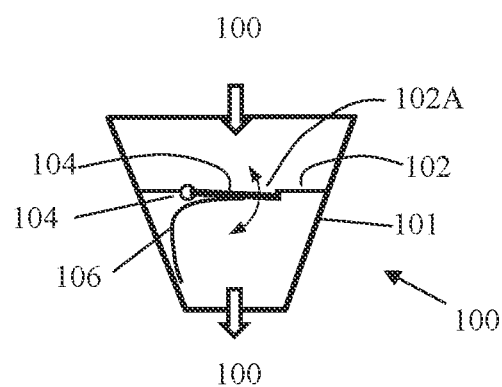
FIGS. 10A and 10B schematically depicting pressure regulating assemblies according to embodiments of the present invention.
Figure 10B:
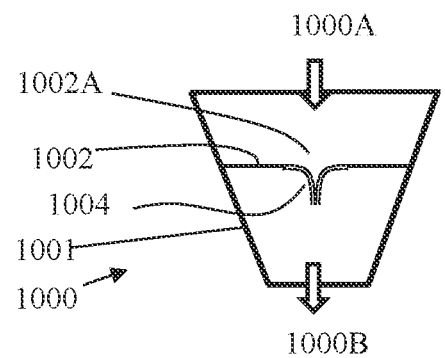

Reference is made now to FIGS. 10A and 10B, schematically depicting pressure regulating assemblies 100 and 1000, respectively according to embodiments of the present invention. Pressure regulating assemblies 100, 1000 may comprise assembly body 101, 1001, adapted to be disposed or installed as described above with respect to FIG. 9, having inlet 100A, 1000A and outlet 100B, 1000B, respectively. Pressure regulating assemblies 100 and 1000 may have internal partition 102, 1002 which has, each, a flow-through hole or passage 102A, 1002A that may allow flow of fluid through it from the inlet 100A, 1000A towards the outlet 100B, 1000B, when the passage is opened. At the passage a flow barrier 104, 1004 may be disposed, such that in a normally-closed position so that it blocks flow through passage 102A, 1002A, respectively. Barrier 104 may be a piece of material adapted to hermetically close passage 102A due to the force provided by springy element 106 that pushes barrier 104 against the passage lips. The force applied onto barrier 104 by springy element 106 may be adjusted to enable opening of passage 102A only when the pressure of fluid at the side of barrier facing inlet 100A exceeds s defined pressure level. Accordingly, only when the pressure of fluid at the side of inlet 70A exceeds the predefined pressure level barrier 104 will open and fluid will be able to flow towards outlet 100B. It will be apparent that barrier 104 with springy element 106 will maintain the pressure at the side of barrier 104 facing inlet 100A at the predefined pressure value as long as there is fluid provided through inlet 100A with pressure equal to or higher than the predefined pressure value. The operation of pressure regulating assembly 1000 is similar with the exception of the operation of the flow barrier. Here the flow from inlet 1000A to outlet 1000B is prevented by the springy lips 1004 that are normally pressed toward each other due to a preloaded spring element. The force lips 1004 are forced against each other may be set so that only when fluid with pressure equal to or higher than predefined pressure is in the side of housing 1000 closer to inlet 1000A the lips 1004 will open allowing flow of fluid towards outlet 1000B. here also it will be apparent that barrier lips 704 will maintain the pressure at the side of barrier 704 facing inlet 1000A at the predefined pressure value as long as there is fluid provided through inlet 1000A with pressure equal to or higher than the predefined pressure value.

Figure 11:
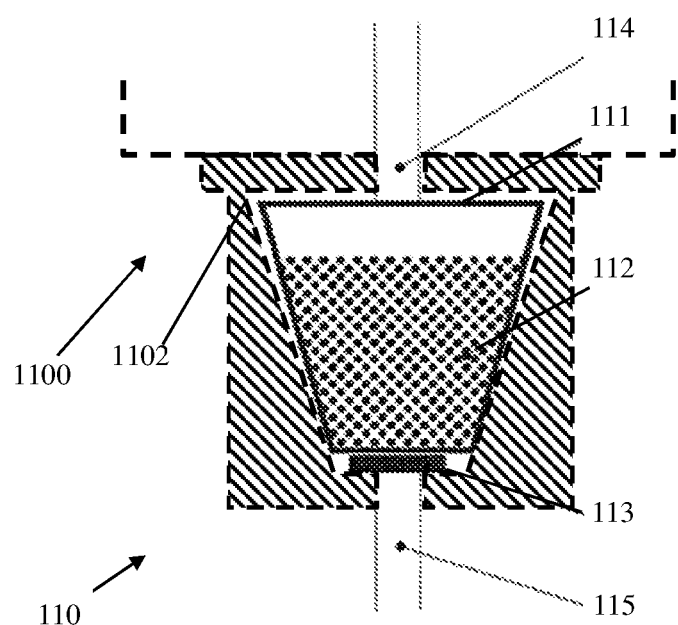
FIG. 11 schematically depicts a coffee capsule built and operative according to embodiments of the present invention.

Reference is made now to FIG. 11, which schematically depicts coffee capsule 110 built and operative according to embodiments of the present invention. Capsule 110 may be located inside a corresponding cavity 1102 made in coffee machine 1100, where only its last part, adapted to provide hot water, is drawn in FIG. 11, using dashed lines. Coffee machine 1100 may be any known type adapted to accommodate coffee capsules, with inlet tube 114 adapted to provide hot water and outlet tube 115, adapted to provide prepared coffee, for example to a cup. Capsule 110 may have capsule case 111 that may be formed in a shape that will fit into cavity 1102, with upper face adapted to be pierced as is readily done in coffee machine 1100, in order to allow entry of hot water into capsule 110 at its inlet face, as part of the coffee preparation process. Capsule 110 is adapted to contain inside it hot drink ingredient material 112, such as coffee grinds. At the outlet face of capsule 110, farther from the entry inlet face, pressure regulating valve 113 may be formed or disposed. Valve 113 may be built and operative so that it opens only when fluid pressure inside capsule 110 exceeds predefined cap pressure level CapPP, thereby allowing fluid to flow out only when it opens to maintain pressure level inside capsule 80 substantially equal to CapPP, as long as the pressure of hot water provided by machine 1100 is at least equal to CapPP thus allowing preparation of the coffee at a desired pressure level. It will be apparent that different coffee capsules may be provided with valves having different CapPP values, thus allowing adaptation of desired coffee brewing pressure to respective coffee blends. It will further be apparent that capsule 110 may contain hot drink ingredient of drinks other than coffee, such as tea, or the like.

Figure 12:
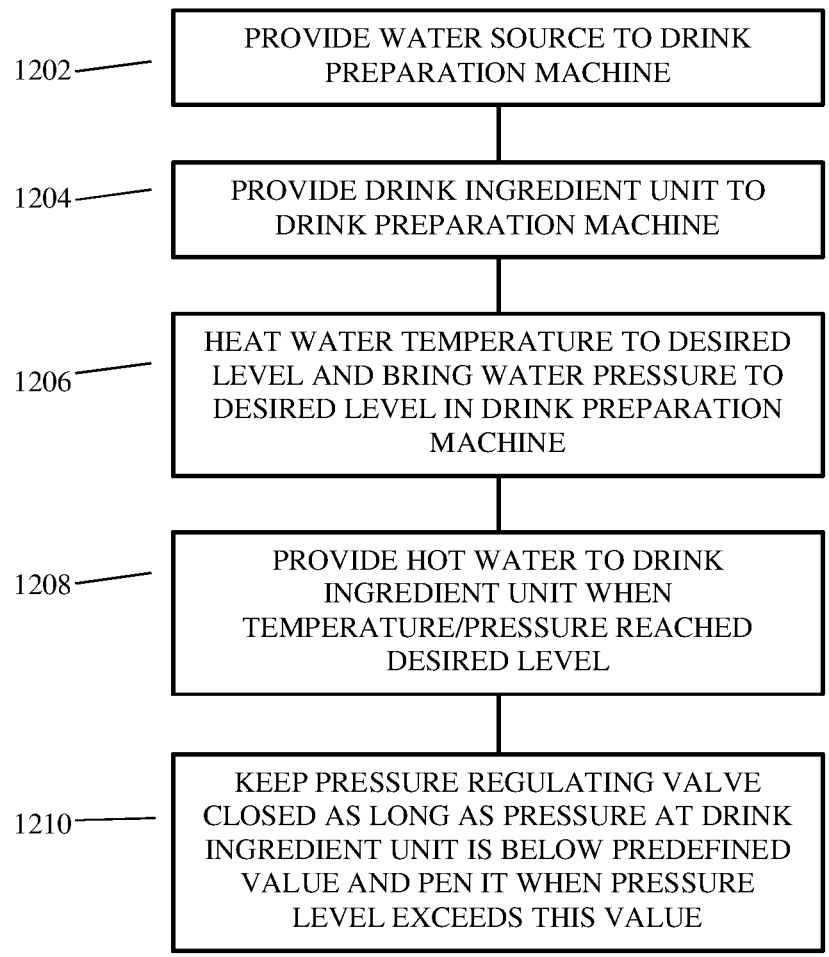
FIG. 12 is a schematic flow diagram presenting steps for preparing brewed drink at a defined pressure, according to embodiment of the present invention.

Reference is made now to FIG. 12, which is a schematic flow diagram presenting steps for preparing brewed drink at a defined pressure, according to embodiment of the present invention. Water is provided to drink preparation machine (block 1202) and drink ingredient unit is inserted to the machine (block 1204). The water is heated to achieve desired temperature and pressure levels (block 1206). When the water reached the desired conditions it is provided to the drink ingredient unit (block 1208). The hot water pressure inside the ingredient unit raises till it exceeds a predefined pressure level and then pressure regulating valve is opened (block 1210) thereby maintaining the pressure at the drink ingredient unit fixed at the predefined pressure level until water supply ends. The hot drink that exits the machine, brewed at a predefined fixed pressure level, may be provided to a user.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:
1. A device for preparation of hot beverages comprising:
a hot water assembly adapted to provide water with a determined pressure and temperature;
a heating unit, adapted to receive a determined amount of hot beverage base material (HBBM) in a cavity, the HBBM being packed in a capsule whose contents are only accessible when the capsule is pierced, to roast the HBBM in the capsule prior to brewing the HBBM by means of hot water provided by the hot water assembly;
a stirring unit, adapted to stir the HBBM in the heating unit; and a control unit, adapted to control the operation of the hot water unit, the heating unit and the stirring unit.

2. The device of claim 1 further comprising pressure control means to control the pressure of water developed within the HBBM during brewing.

3. The device of claim 1 with the capsule comprising means adapted to control the pressure of water developed inside the capsule during brewing.

4. The device of claim 1 wherein the heating unit comprises at least one of an ohmic element, a RF generator with antenna, and hot air flow.

5. The device of claim 1 wherein the stirring unit is selected from a list consisting of a mechanical vibration producing unit, a mechanical rotation producing unit, and an air blowing unit.

6. The device of claim 5 wherein the stirring unit further comprises a rod to transfer stirring movements to a stirrer disposed inside the capsule.

7. The device of claim 1 further comprising a pressure regulating assembly adapted to control the pressure of water developing in the cavity during brewing.

8. The device of claim 7 wherein the pressure regulating assembly comprises a flow barrier with a springy element disposed in a flow path of the water out of the cavity.

9. A method for preparing hot beverage comprising:
providing a defined amount of non-roasted or partially roasted HBBM, the HBBM being packed in a capsule whose contents are only accessible when the capsule is pierced, to a cavity in a heating and stirring device;
heating the HBBM to a defined temperature for a defined period of time and stirring the HBBM during the defined period of time;
brewing the HBBM by providing water at a determined temperature and determined pressure to the HBBM at a desired pressure of the water; and
providing the water to a user.

10. The method of claim 9 wherein the heating time period and temperature provided to the HBBM prior to the brewing step is determined based on the nature of the HBBM and a desired resulting drink.

11. The method of claim 9, wherein the comprises means adapted to control the pressure of water developed inside the capsule during brewing.

12. The method of claim 9 wherein the hot beverage base material (HBBM) is one of coffee grinds, cacao grinds and scrunched tea leaves.

* * * * *